Feb. 28, 1928.                                                    1,660,596
                       P. DE GUARDIA-CALMÈTES
                          LOOM FOR WEAVING REEDS
                        Filed June 28, 1926       14 Sheets-Sheet 2

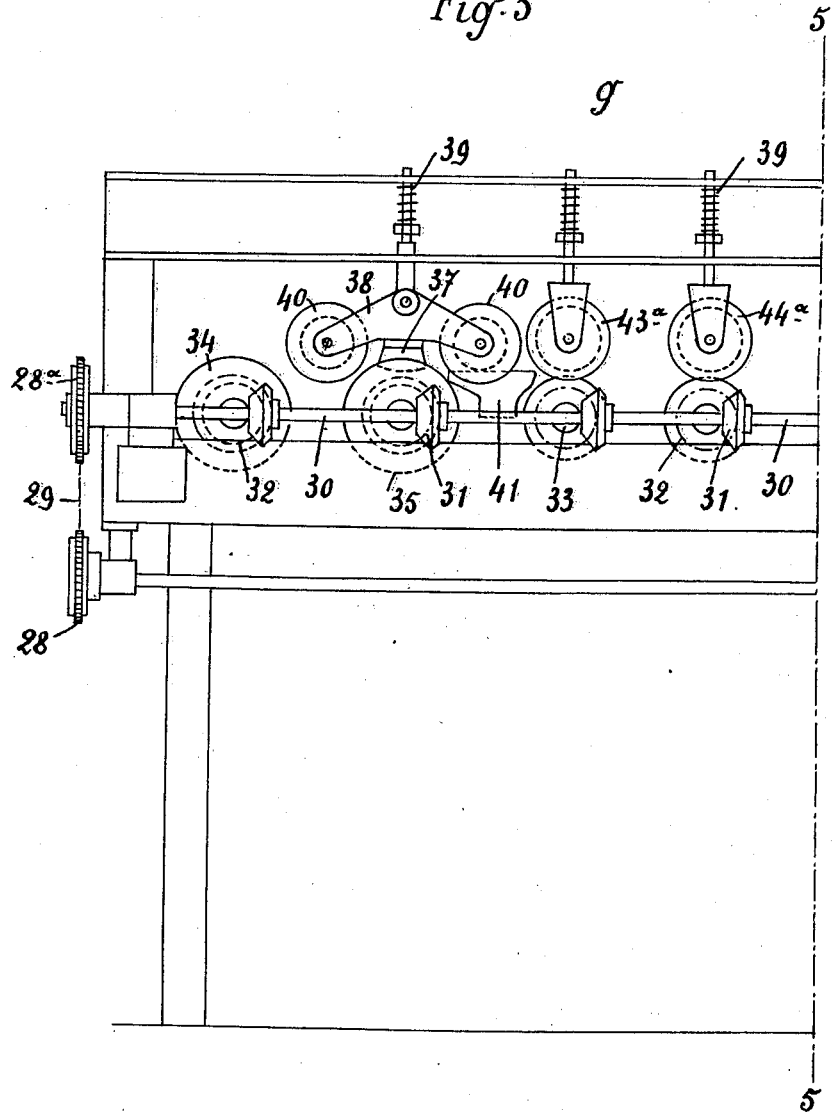

Feb. 28, 1928.                                                                1,660,596
P. DE GUARDIA-CALMÈTES
LOOM FOR WEAVING REEDS
Filed June 28, 1926        14 Sheets-Sheet 3
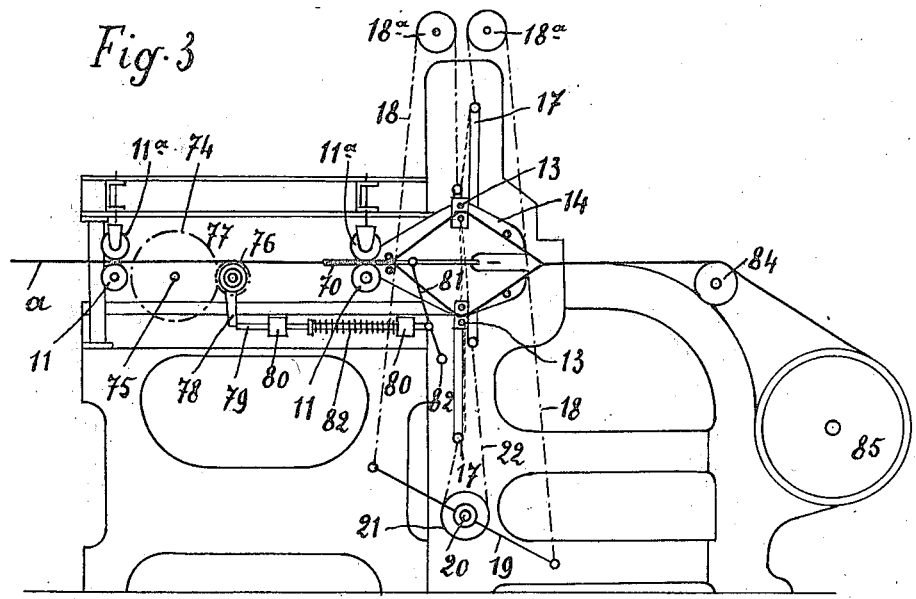
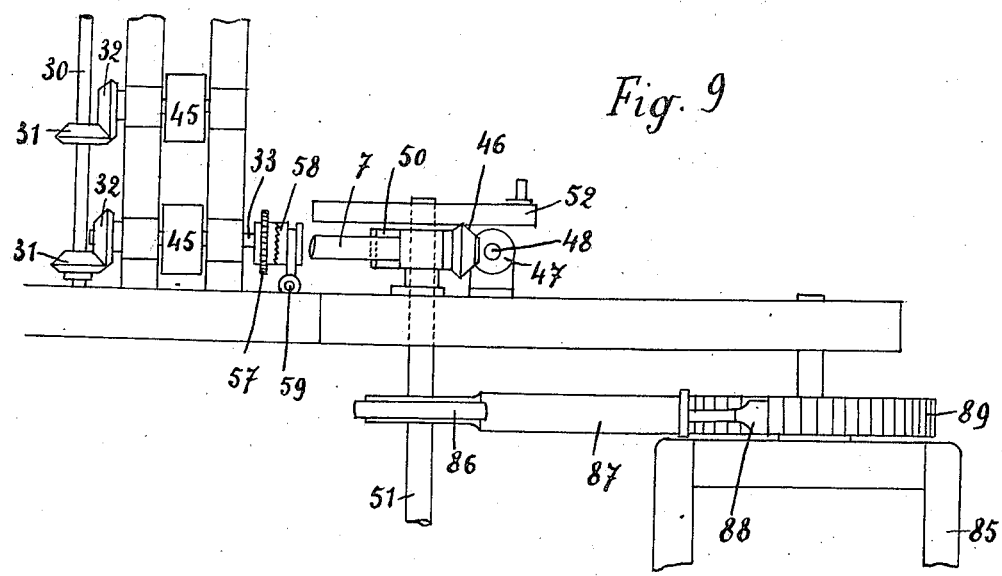

Feb. 28, 1928. 1,660,596
P. DE GUARDIA-CALMÈTES
LOOM FOR WEAVING REEDS
Filed June 28, 1926 14 Sheets-Sheet 4

Inventor
Paul de Guardia-Calmètes
By  atty.

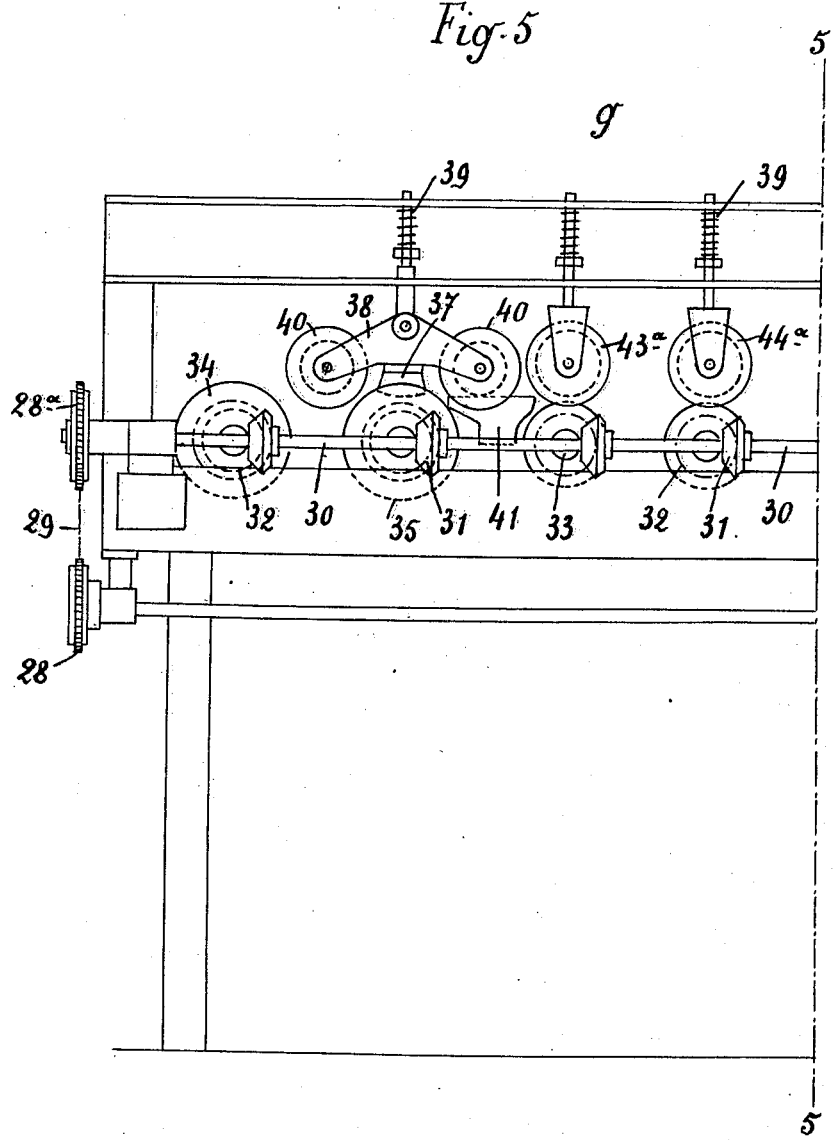

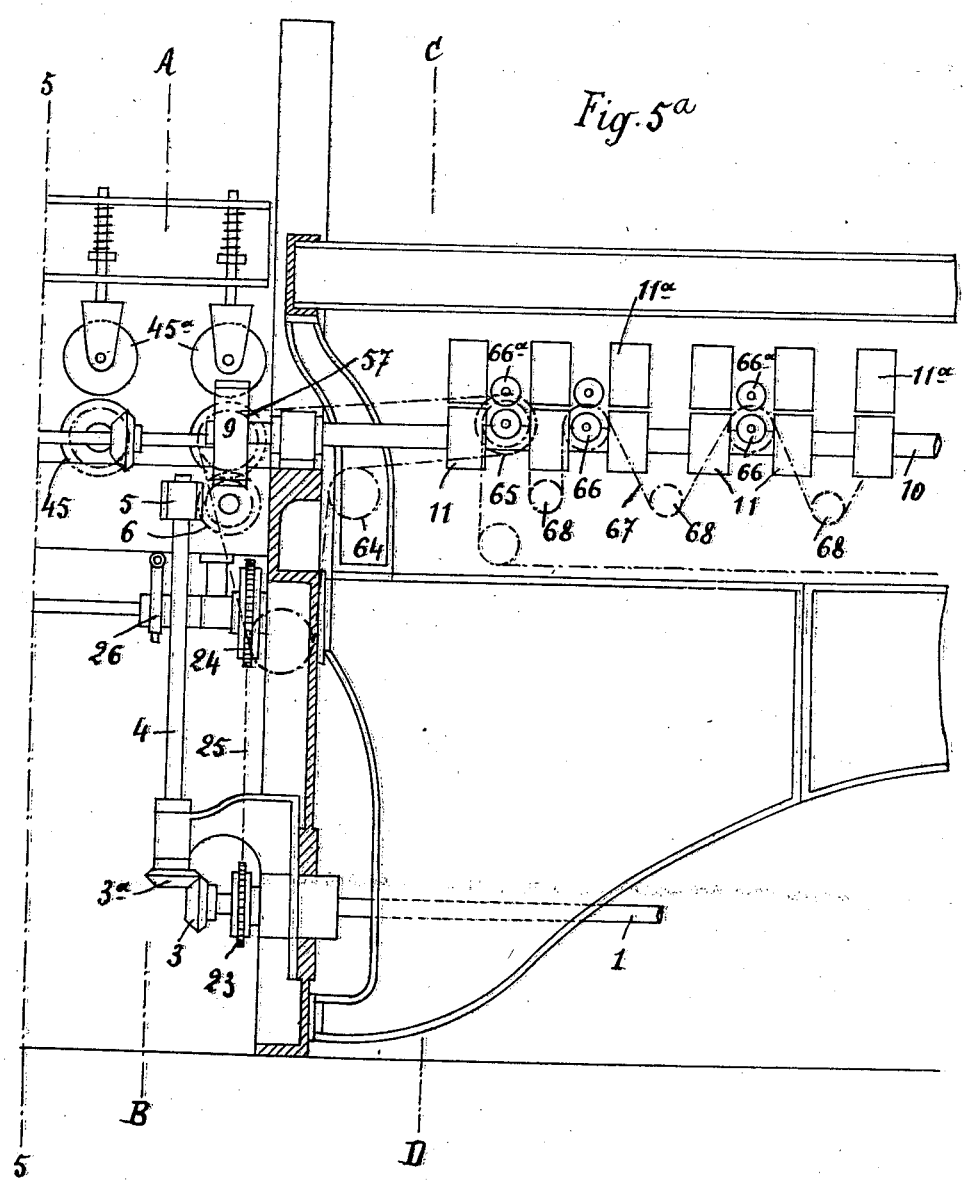

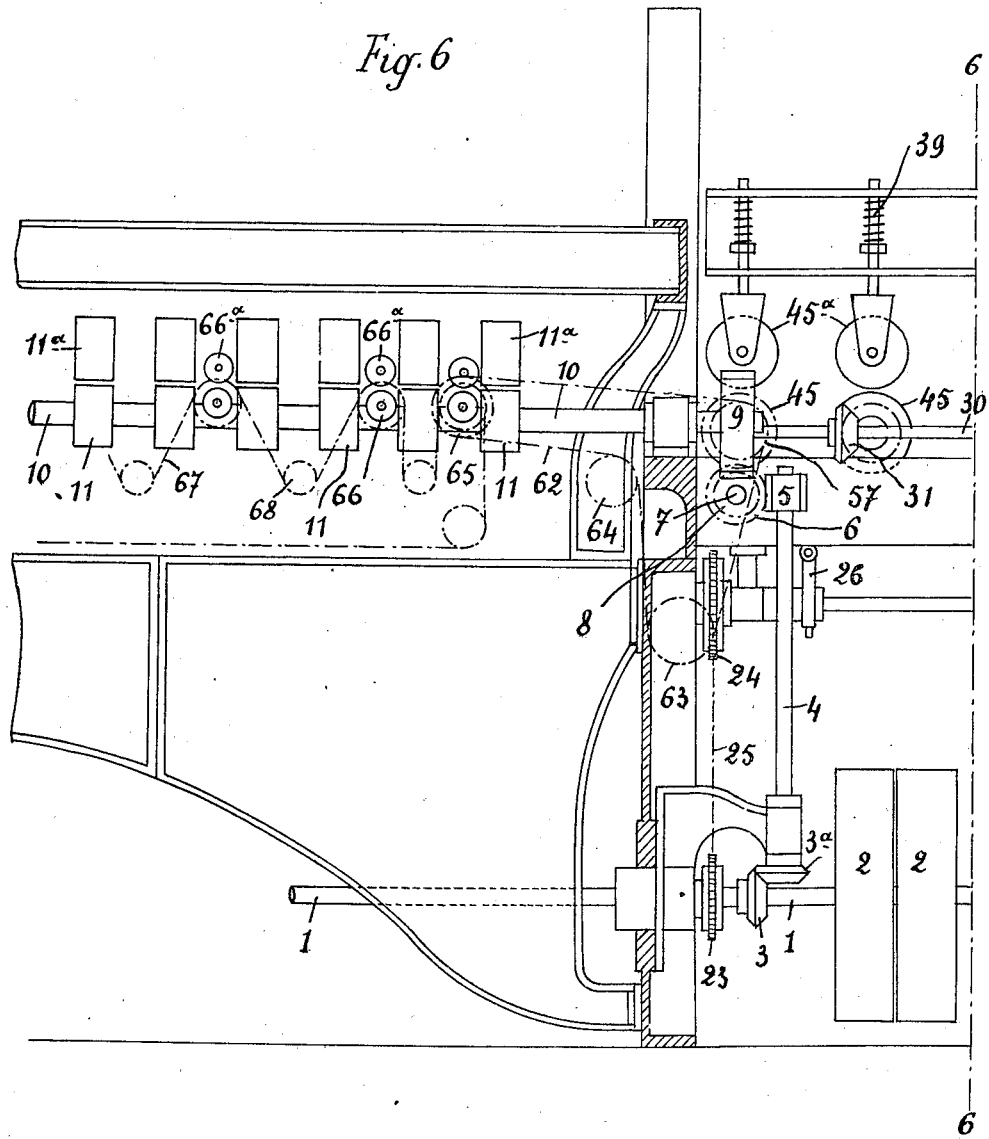

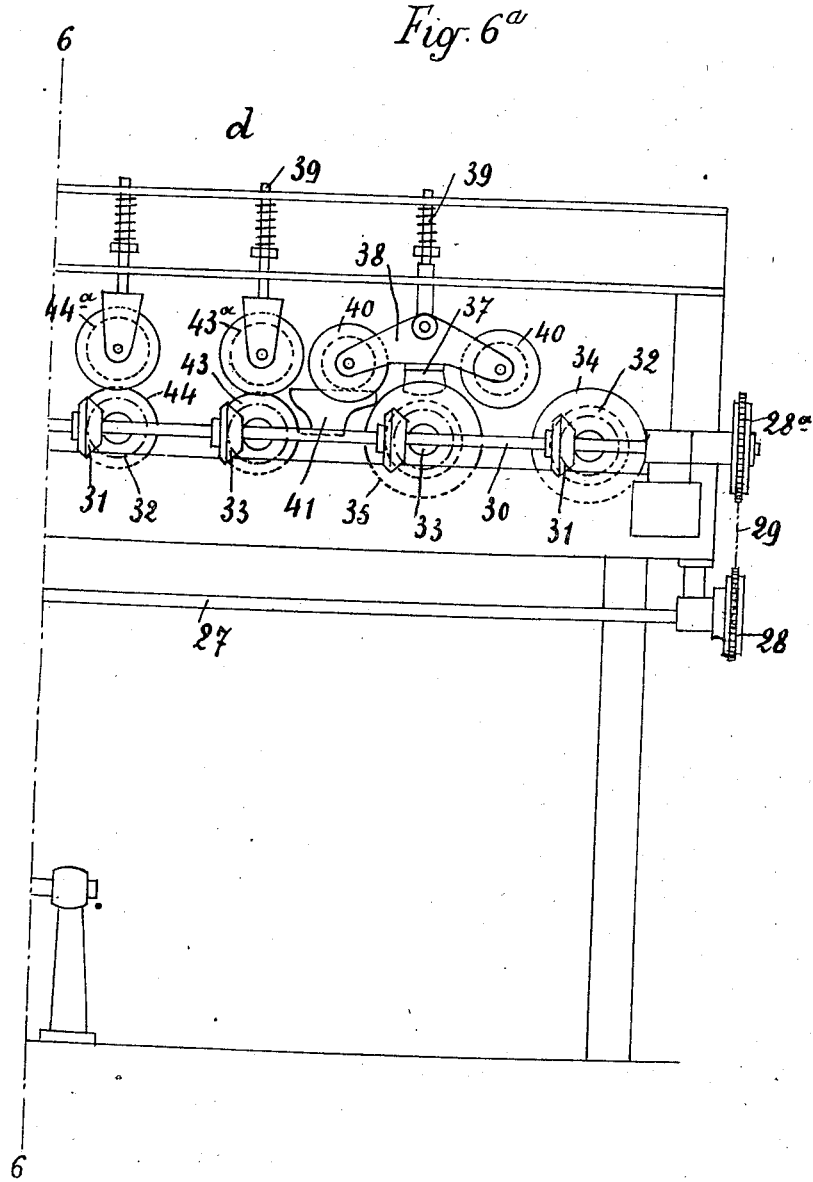

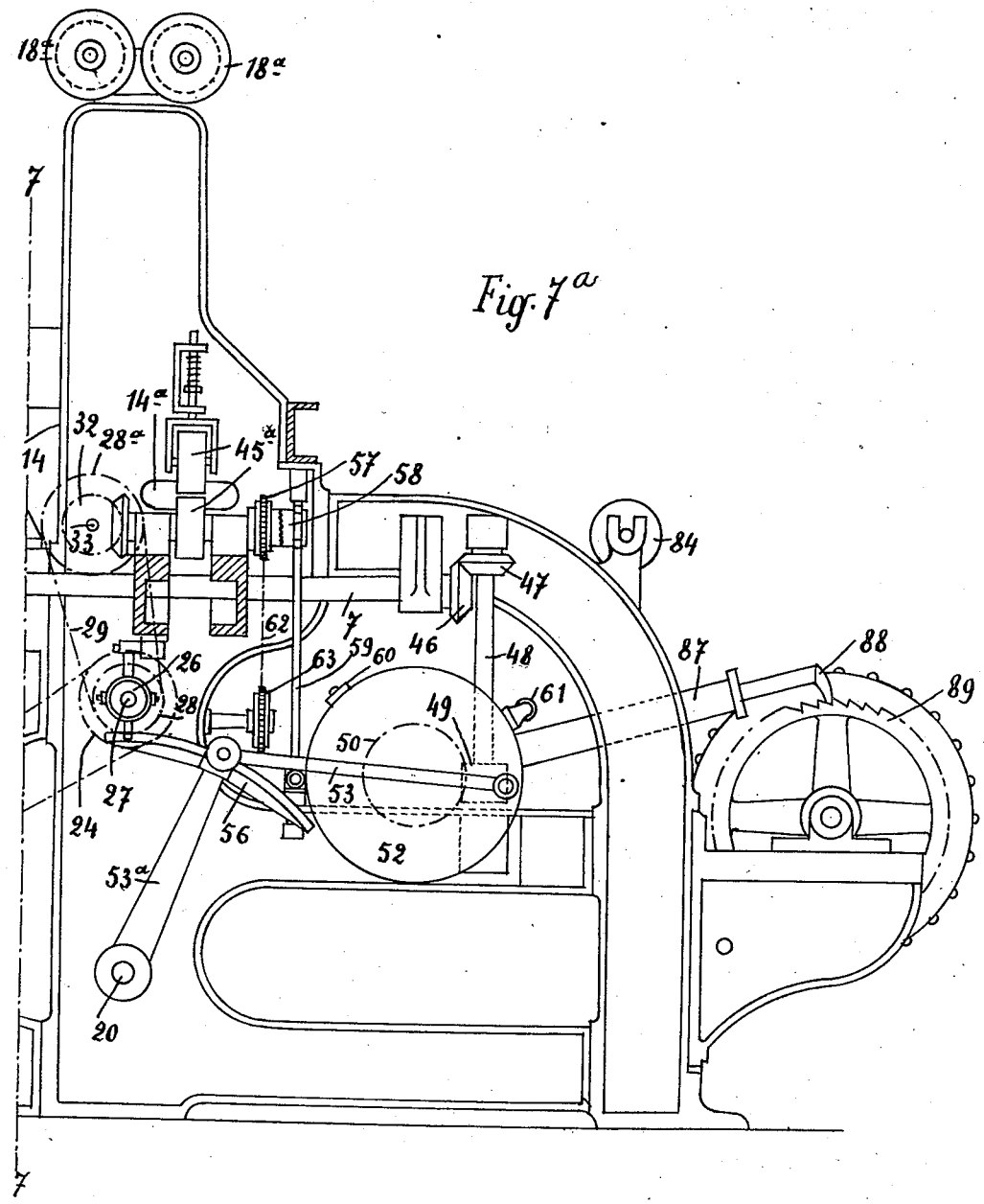

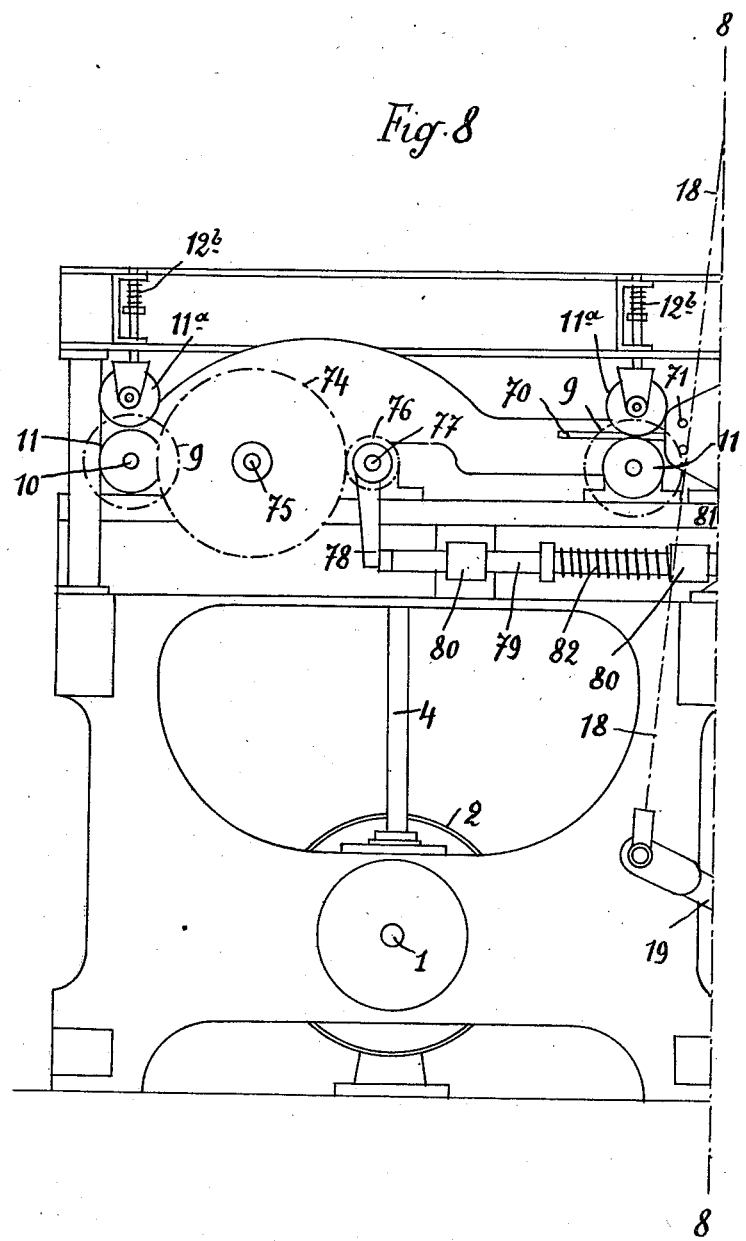

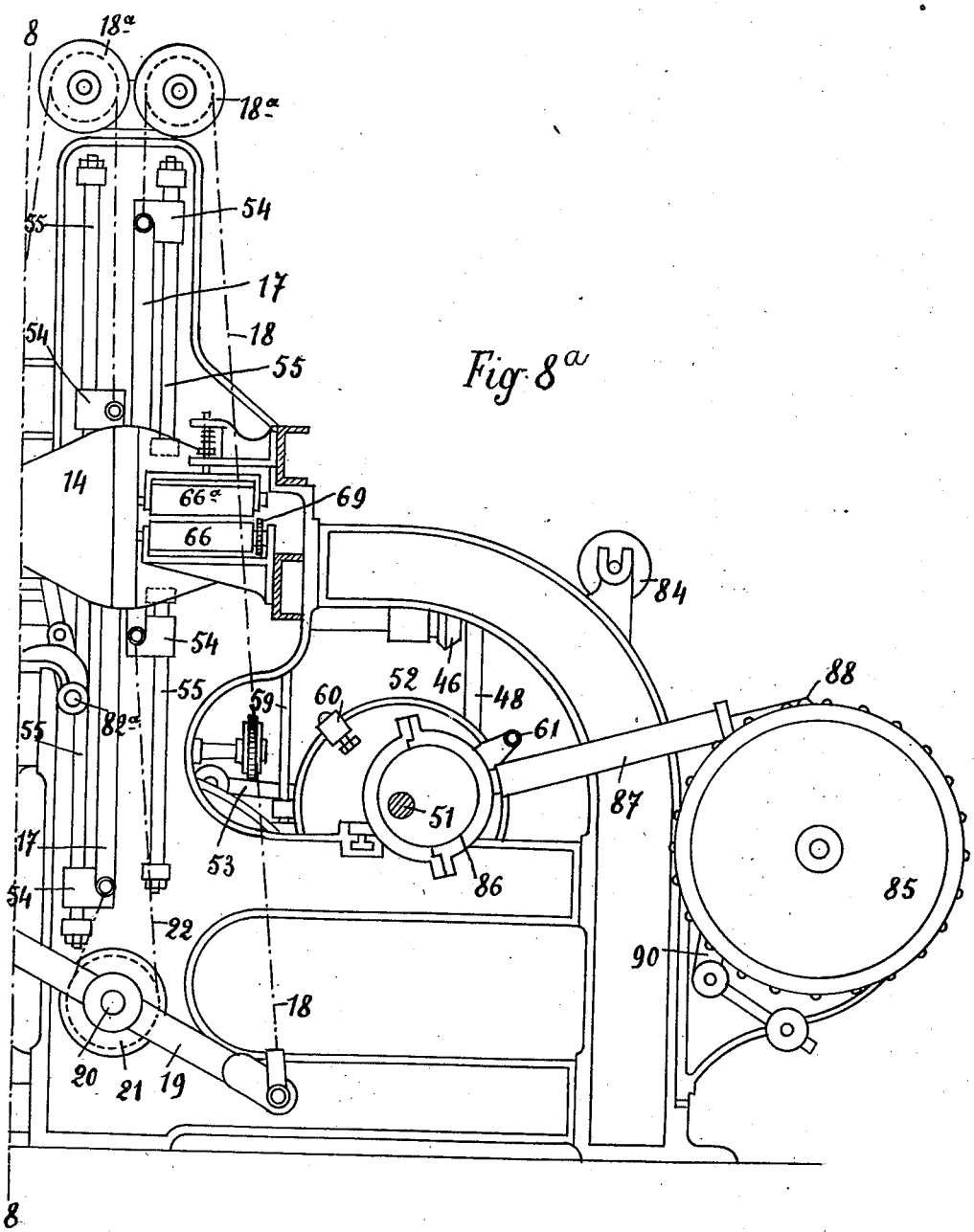

Feb. 28, 1928.

P. DE GUARDIA-CALMÈTES 1,660,596

LOOM FOR WEAVING REEDS

Filed June 28, 1926    14 Sheets-Sheet 12

Feb. 28, 1928.　　　　　　　　　　　　　　　　1,660,596
P. DE GUARDIA-CALMÈTES
LOOM FOR WEAVING REEDS
Filed June 28, 1926　　　14 Sheets-Sheet 13

Inventor
Paul de Guardia-Calmètes,
By
Atty

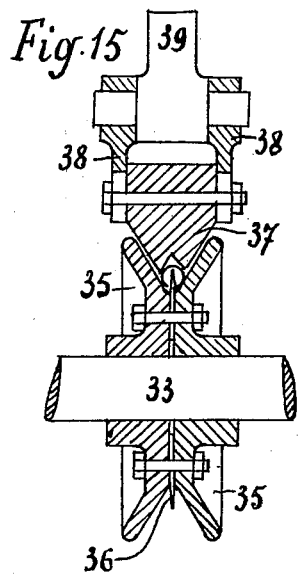
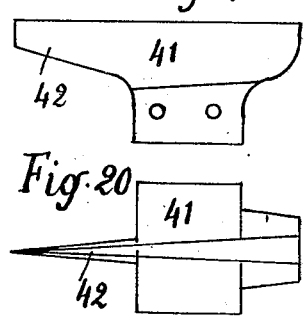
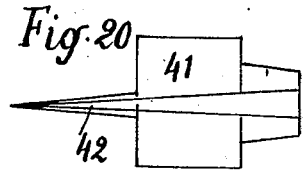
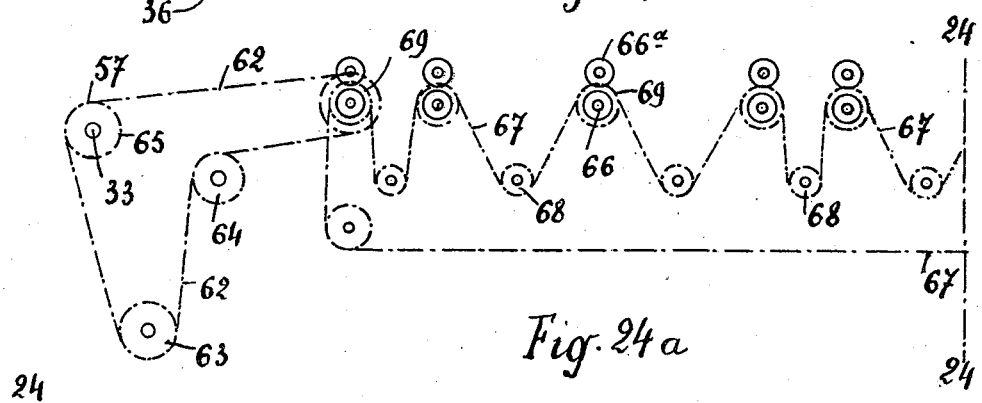
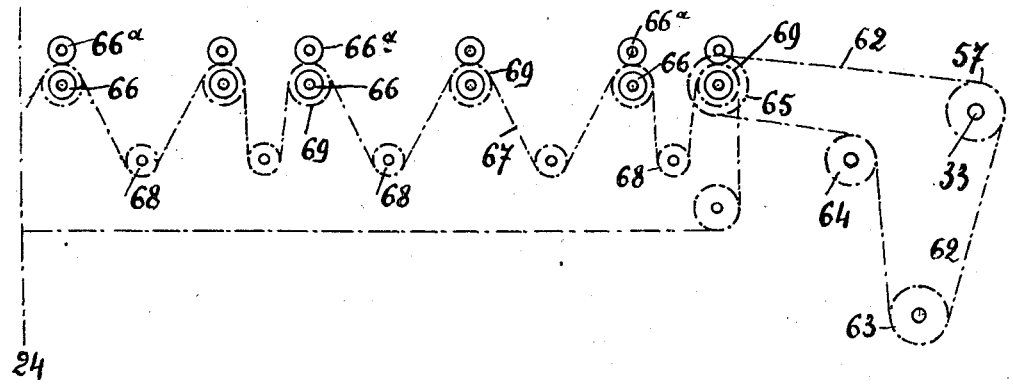

Patented Feb. 28, 1928.

1,660,596

UNITED STATES PATENT OFFICE.

PAUL DE GUARDIA-CALMÈTES, OF PRES ST. MEDARD, FRANCE.

LOOM FOR WEAVING REEDS.

Application filed June 28, 1926, Serial No. 119,136, and in France July 24, 1925.

This invention relates to a loom for the manufacture of reeds, wood strips and the like into a woven fabric which may be applied to various uses.

In this loom the warps as also the wefts are horizontal and they are both used in the form of flat ribbons made of split reeds which are subsequently opened and flattened.

The reeds designed to form the warps are made into bands in a special machine before their introduction in the loom between pairs of flat rollers of which the ribbed ones are mounted upon a shaft actuated by the general driving means. The said rollers cause the warps to move forward in separating passageways and then to pass between other pairs of rollers before their engagement in the movable heddles designed to form the shed for the introduction of the wefts.

The continuity of the warp is ensured by feeding bands by hand when the advancing band is about to disappear betwen the admission rollers. The bands designed to constitute the warps being of different lengths, the points where two bands are superimposed are disseminated in the woven fabric.

The loom comprises also on both sides of the warps two weft preparing devices, but in this arrangement the reeds or strips being cut of the same length are introduced whole at their thick end and made automatically into bands before being engaged in the warps.

The weft bands which have thus been prepared before their introduction in the warp are engaged mechanically between any number of rollers which guide them until they are completely inserted in the warps. Upon each of these rollers is provided a pinion engaging an endless chain which is driven by suitable gearings from right to left when the right hand weft is inserted and from left to right when it is the left hand weft.

During the passage of the right hand weft the left hand feeding device remains stationary and inversely so that the woven fabric is perfect, the thick ends of the reeds are first engaged on the right and on the left in such a manner that in the woven fabric a thick end always being next a small one the width of the weft produced by two succeeding bands is the same in the whole width of the fabric.

When a weft has been inserted it is pushed slowly and progressively in the warps by horizontal lathes having a rectilinear motion in such a manner as to press it in the fabric without injuring it.

This invention has also for its object driving means designed to actuate the heddle supporting frames so as to cause the opening of the shed, means for winding automatically the woven fabric and other devices which will be subsequently described.

The accompanying drawings show a loom constructed according to the present invention.

Fig. 1, 1ª is a diagrammatic front view of the loom.

Fig. 2, 2ª is a plan view of same.

Fig. 3 is a cross section of same.

Figs. 5, 5ª and 6, 6ª represent in front views, on a larger scale, the left and right sides of the loom respectively.

Figure 4:
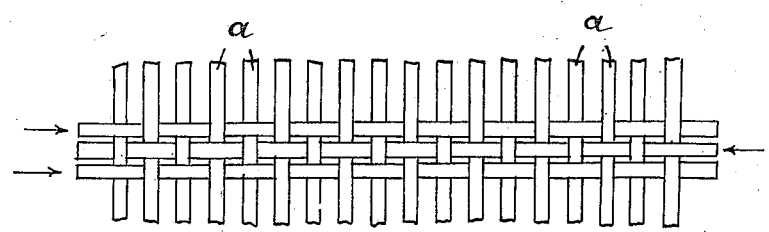
Fig. 4 illustrates a piece of the fabric woven in the loom.
Figure 7:
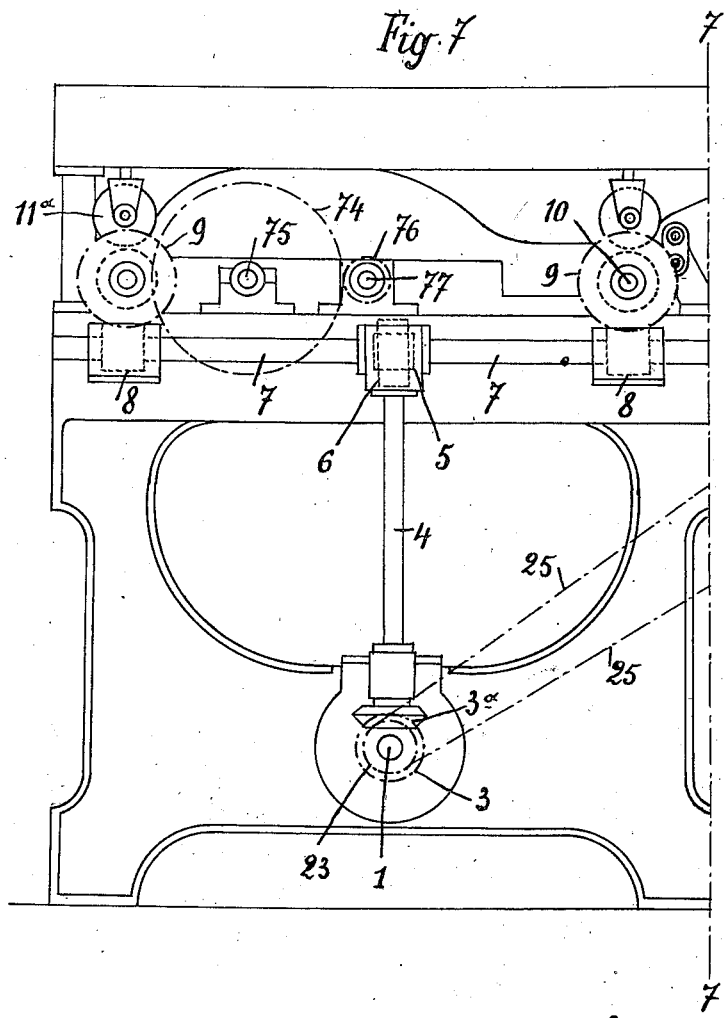

Figs. 7, 7ª and 8, 8ª are sectional views on line A—B and C—D of Fig. 5 respectively.

Fig. 9 is a plan view of one of the uncoupling devices for the feeding chain of the small weft introducing rollers and of the driving means for rotating the winding beams for the woven fabric.

Figure 10:
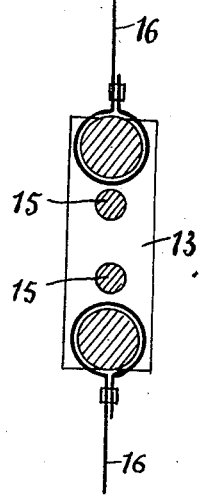
Figure 11:
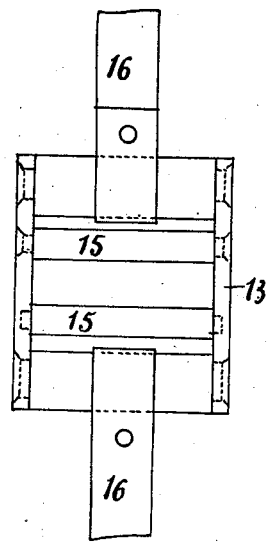

Figs. 10 and 11 represent a heddle in cross section and front view respectively.

Figure 12:
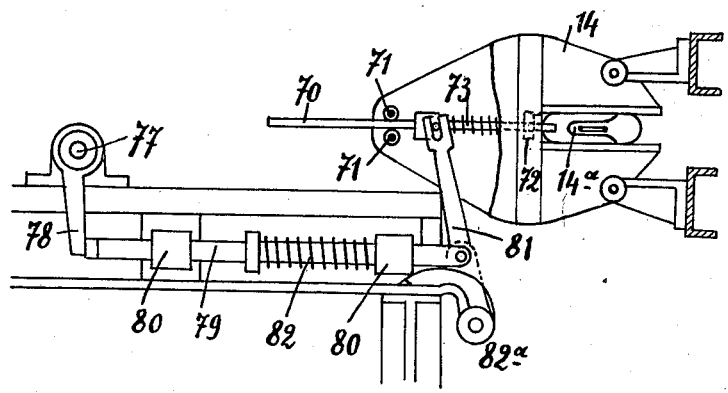

Fig. 12 illustrates a lathe and its driving mechanism.

Figs. 13 to 23 show the devices for transforming immediately a reed into a flat band in order to constitute a warp element.

Fig. 24, 24ª is a diagrammatic view showing the general driving means for the weft feed rollers.

A bevel gear 3 cooperating with a second bevel gear 3ª secured to the shaft 4 which also carries at its upper end a worm wheel 5 in which engages an endless screw 6 fixed upon shaft 7 is keyed at both ends of the drivng shaft 1 carrying the grooved rollers 2.

The shaft 7 carries in its turn two other screws 8, 8 as will be seen in Figs. 6 and 7 engaging worm wheels 9, 9 keyed upon shafts 10, 10 respectively which carry the lower feeding rollers for the warps a, Fig. 3.

The warps are guided through guideways 12 formed by sheet metal plates as will be seen in Fig. 2, to be taken up in the vertically moving heddles 13 which are guided between another set of plates 14 forming an extension of the guideways 12, the plates 14 are provided with openings 14ᵃ for guiding and supporting the wefts.

The upper rollers 11ᵃ are carried upon spring rods 12ᵇ, Fig. 8, in such a manner as to allow them to rise or to descend according to the thickness of the reed bands.

The warp band coming from the second set of rollers 11, 11ᵃ passes between two bars 15 carried upon the heddles 13 which are connected by means of cables 16 to movable frames 17, 17 and guided vertically in recesses provided in the sides of the plates 14. Concerning the heddle frames 17, it will be noted that the frame for each of them is formed by a rigid upper part and an equally rigid lower part; these parts being united towards their extremities by rigid bars forming cross-pieces in such manner as to constitute a rigid and non-deformable frame. This is shown in Fig. 1.

The two rod holder frames function together alternatively as has been explained; referring to Figs. 3 and 8, it is seen that each of the frames is united at its upper part by a cable 18 fixed at its lower part to one of the two arms 19 constituting a lever.

At another part the bases of the two frames are united together by another cable 22 passing over a pulley 21 placed on the shaft 20. There results from this arrangement that the lengths of the two cables 18 and 22 are invariable.

If the left arm 19 of the lever is lowered, the cable 18 of the left hand heddle frame is drawn toward the bottom part and this frame rises drawing on the cable 22. For this reason the other end of the cable 22 attached to the right hand heddle frame is drawn toward the bottom part, while the arm 19 on the right hand frame lowers; it will be the same when the right hand arm 19 is lowered, it will be the right hand frame which will be raised, while the left hand one will be lowered.

The frames 17, 17 are connected on both sides and at their upper ends to cables 18, 18 running upon grooved rollers 18ᵃ and secured at their other ends to cross-beam arms 19, one on each side carried upon an oscillating shaft 20 which is actuated in the manner hereinafter described. The shaft 20 carries also at both ends a drum 21 upon which runs a cable 22 connected at both ends to the bottom of the frames 17, 17 respectively, as will be seen in Figs. 3 and 8.

The driving gear for the two weft preparing devices $d$, $g$ placed on both sides of the loom being similar it will be sufficient to describe one of them only.

The driving shaft 1 carries a wheel 23 which drives by means of a chain 25 a second wheel 24 driving in its turn by means of an automatic clutch 26 a shaft 27 which carries a wheel 28, the latter actuating by means of a chain 29 another wheel 28ᵃ keyed upon a shaft 30 provided with bevel wheels 31 in gear with other bevel gears 32 keyed upon the ends of the shaft 33 upon which the various lower rollers which act to transform directly a reed into a flat band before its introduction in the warps are mounted as will be seen in Figs. 5, 6, 9.

Figure 13:
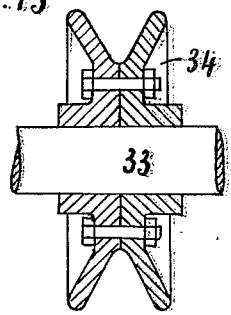
Figure 14:
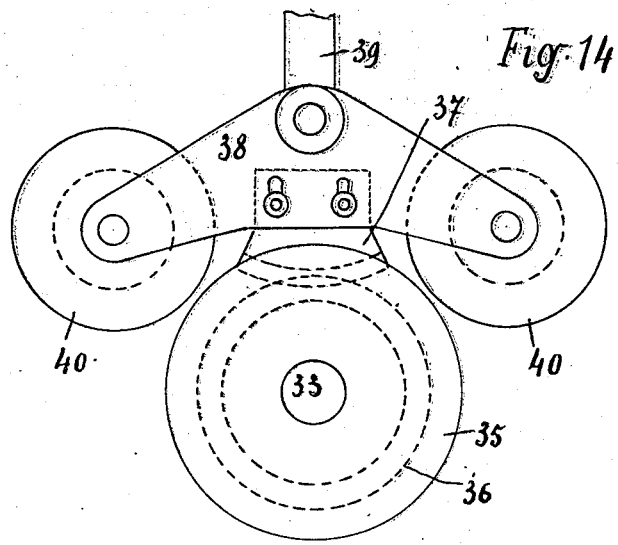
Figure 23:
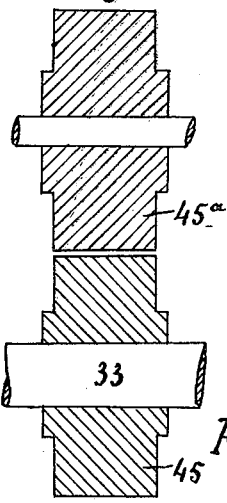
Figure 16:
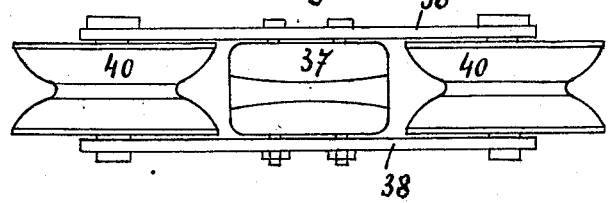
Figure 21:
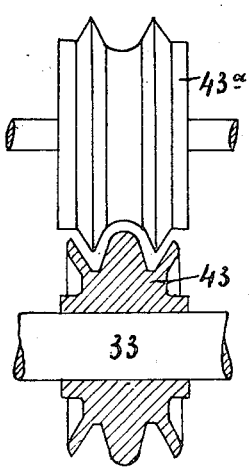
Figure 22:
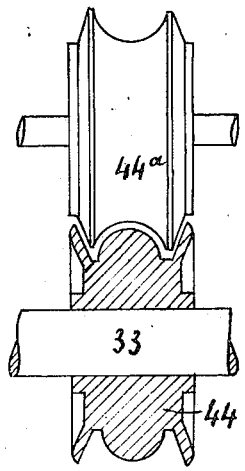

The transformation of reeds into bands is effected by pushing a reed upon the guide roll 34 as will be seen in Figs. 1, 5 and 13 in order to compel it to enter between the splitting cylinder 35 provided with a circular blade 36, and the pressing device 37 which is placed above and is carried by a support 38 mounted upon a spring rod 39 and provided with two grooved guide-rolls 40 as will be seen in Figs. 1, 5, 14, 15, and 16.

The reeds serving as a weft are not split to form two parts, but the upper side of each of the reeds is split longitudinally, then the reed thus split is opened and flattened in such manner as to form a single flat band forming a weft.

As has been previously said the right hand weaver, for example, prepares a reed into a single ribbon which is introduced and carried along in the step of the chains, then when this step has changed, the chains having advanced, it is the left hand weaver that transforms a reed into a ribbon in order to be introduced into the chains.

A device 41 is placed directly behind the splitting cylinder 35 and has for its object to open the split reed by means of a blade of increasing thickness 42. The reed previously opened by the tool 41 is fed between the two fluted cylinders 43, 43ᵃ where it is more completely opened, see Figs. 5 and 21, from thence it passes between other fluted cylinders 44, 44ᵃ which open it still more completely, see Figs. 5 and 22, and comes finally between two pairs of flattening cylinders 45, 45ᵃ which transform it into a flat band which is then ready to be introduced between the warps.

The upper cylinders 43ᵃ, 44ᵃ, 45ᵃ are mounted upon spring rods 39 in the same manner as the upper warp feeding rollers.

A bevel gear 46 engaging in a bevel gear 47 mounted upon a vertical shaft 48 is keyed upon the driving shaft 7 of the warp rollers 11, said shaft 48 transmits its movement by means of a worm gear 49, 50 to a horizontal shaft 51 carrying at both ends a crank disc 52. The latter by the intermediary of the connecting rod 53 communicates an alternate motion to an arm 53ᵃ keyed upon shaft 20 upon which the cross-beams 19 operating the supporting heddle frames 17 are mounted. These supporting frames are made integral with slides 54 moving upon stationary guides 55 as will be seen in Fig. 8.

The arm 53 carries at its upper end a segment 56 provided with a sinuous cam actuating at suitable times the clutching device 26.

A wheel 57 loosely mounted upon the shaft 33 of the last flattening cylinder of each weft preparing device is automatically clutched with said shaft or unclutched by means of a pawl and ratchet mechanism, the oscillating collar of which is carried by an axis 59 made integral with a lower arm upon which two abutments 60, 61 carried upon the crank disc act alternately for a purpose indicated below, the abutment 60 producing the clutching and the abutment 61 the unclutching.

As will be seen in Figs. 5, 6 and 24, an endless chain 62 runs upon both wheels 57 and engages by means of transmission gears 64, 64 with a wheel 65 keyed upon the axis of the first weft feed roller 66. The two end rollers 66 are themselves connected by an endless chain 67 running by means of transmission rollers 68 upon toothed wheels 69 mounted upon the axes of all the feed rollers 66 which carry spring pressure rollers 66ᵃ. Owing to this arrangement when the clutching is effected on the right hand side upon the shafts 33, 27 and when the latter are unclutched on the left side, the chain 67 moves to the left, the wheel 57 being unclutched on that side and turning loose upon shaft 33, the reverse will happen when the clutching takes place upon the shafts on the left side 33, 27, the chains then moving to the right.

The lathe properly so called are designed to push the wefts in the warps. There may be any desired number of such lathes, eight for instance as shown in the drawings, constituted by blades 70 which execute a horizontal rectilinear run between guides 71, 72 and are provided with return springs 73. The lathes are actuated by means of toothed wheels 74 mounted upon a shaft 75 itself actuated by the driving mechanism of the loom which is engaged with two bevel gears 76 mounted upon a shaft 77 upon which are fixed rotary arms 78 as will be seen in Figs. 2, 8, 12, which at every turn of the shaft 77 push progressively the sliding axes 79 in guides 80. The ends of both axes 79 are articulated with a lever 81 oscillating at its lower part around a fixed point 82ᵃ, its upper forked part engaging with a pin carried upon the lathe, a return spring 82 is provided on both axes 79.

A suitable device may be aranged on both sides inside the loom to stop the weft bands in the warps, such for instance as articulated shutters 83, see Fig. 1, opening in one direction only in such a manner as to give free passage to the advancing weft, the end of which engages the opposite shutter when it is completely engaged in the warps.

The woven fabric runs upon a transmission roller 84 before being wound upon the beam 85 which is operated by means of an eccentric 86 provided with an arm 87 in two parts provided with an interior spring, said arm carrying a feed pawl 88 engaging a ratchet wheel 89 integral with the beam, a weighted stopping pawl 90 being provided to prevent any return movement of the beam.

In operation the warp bands move forward, the shed is opened by the action of the supporting heddle frames 17 actuated by the cross-beams 19, when the two clutching elements on the right side 26, 58 for instance are coupled and those on the left are unclutched, a reed is fed in the weft preparing device d where it is transformed into a band before being drawn in the shed by the rollers 66, 66ᵃ the chain 67 of which is set in motion from right to left. When the weft has reached the end of its run, the clutching elements on the right, 26, 58, are uncoupled, the shed closes and at the instant when both groups of warps are in the same plane, the lathes push the weft which has just been inserted in the fabric.

Both groups of warps still operating to change the shed the two left clutches are engaged and the right clutches 26, 58 are disengaged, the reed is then prepared in the weft preparing device on the left, the weft band is thrust between the feed rollers 66, 66ᵃ which start their movement, the warp 67 then going from left to right until the weft is at the end of its run, the shed closes again, the lathes operate and so on, the weft preparing devices d, g being alternately operated.

When strips of wood or the like are used, the strips designed to constitute the weft will pass between plain feed rollers.

What I claim and desire to secure by Letters Patent of the United States is:—

1. A loom for weaving reeds comprising: horizontal warps formed by flat bands constituted by previously opened and flattened reeds; horizontal wefts formed by flat bands constituted by reeds opened and flattened immediately before their introduction in the warp, two weft preparing devices placed on either side of the loom and operating alternately; means in said weft preparing devices to transform the reeds into flat bands; separate passageways to guide the warp bands; pairs of rollers in said passageways to feed the warp bands two supporting heddle frames to operate the warps; lathes having a horizontal rectilinear motion to tighten the wefts in the warps; means to operate the lathes; means to feed and guide the wefts in the warps and means to roll up the woven fabric.

2. A loom for weaving reeds comprising horizontal warps formed by flat bands constituted by previously opened and flattened reeds, horizontal wefts formed by flat bands constituted by opened and flattened reeds, two weft preparing devices placed on either side of the loom acting alternately; preparing discs placed in both weft preparing devices which comprise a splitting disc, opening means, two pairs of opening cylinders and two pairs of flattening cylinders, means to drive the preparing discs, separate passageways to guide the warp bands, pairs of rollers in said passageways to feed the warp bands, the lower striated rollers constituting the feed rollers and the upper rollers being mounted with springs; two supporting heddle frames to actuate the warps, driving means for said frames, lathes having a horizontal rectilinear motion to tighten the wefts in the warps, means to operate the lathes, means to feed and guide the wefts in the warps and means to roll up the woven fabric.

3. A loom for weaving reeds comprising horizontal warps formed by flat bands constituted by reeds previously opened and flattened, horizontal wefts formed by flat bands constituted by reeds opened and flattened, two weft preparing devices placed on either side of the loom and operating alternately, preparing discs in both weft preparing devices, driving means for same, separate passageways to guide the warp bands, roller pairs in the passageways to feed the warp bands, two supporting heddle frames to operate the warps, cross-beams having an alternate motion to operate the supporting heddle frames, a crank disc to operate the cross-beams, spring lathes having a horizontal rectilinear motion to push the wefts slowly and progressively in the warps, rotating arms to operate the lathes at suitable times, means to operate said arms, means to feed and guide the wefts in the warps and means to roll up the woven fabric.

4. A loom for weaving reeds which comprises horizontal warps formed by flat bands constituted by previously opened and flattened reeds, horizontal wefts formed by flat bands constituted by opened and flattened reeds, two weft preparing devices placed on either side of the loom and operating alternately, preparing discs in both weft devices, driving chain wheels for said discs, a transverse shaft driven by said wheels, bevel wheels mounted upon said shaft, bevel wheels carried upon the preparing disc shafts engaging the bevel wheels on the transverse shaft, a clutching means between said shaft and the general driving gear designed to prevent at suitable times the operation of the bevel gear shaft, separate passageways to guide the warp bands, roller pairs in said passageways to feed the warp bands, two supporting heddle frames to operate the warps, cross-beams having an alternate motion to operate the supporting heddle frames, a crank disc to operate the cross-beams, spring lathes having a horizontal rectilinear motion to push the wefts slowly and progressively in the warps, rotating arms to operate the lathes at suitable moments, driving means for said lathes, means to feed the wefts and guide them in the warps, and means to roll up the woven fabric.

5. A loom for weaving reeds comprising: horizontal warps formed by flat bands constituted by previously opened and flattened reeds, horizontal wefts formed by flat bands constituted by opened and flattened reeds, two weft preparing devices placed on either side of the loom and operating alternately, preparing discs in both said devices, driving chain wheels for the preparing discs, a transverse shaft operated by said wheels, bevel wheels upon said shaft, bevel wheels carried upon the preparing disc shafts engaging with the bevel wheels on the transverse shaft, a clutching device placed between the bevel wheels shaft and the general driving gear designed to prevent at suitable times the operation of the bevel gear shaft, separate passageways to guide the warp bands, roller pairs in said passage ways to feed the warp bands, two supporting heddle frames to operate the warps, cross beams having an alternate motion to operate the supporting heddle frames, a crank disc operating the cross beams, spring lathes having a horizontal rectilinear motion designed to push the wefts slowly and progressively in the warps, rotating arms to operate said lathes at suitable moments, driving means for said arms, small rollers to feed the wefts and guide them in the warps, an endless chain actuating the said small rollers, means to actuate the endless chain from right to left and from left to right and means to roll up the woven fabric.

6. A loom for weaving reeds comprising: horizontal warps formed by flat bands constituted by previously opened and flattened reeds, horizontal wefts formed by flat bands constituted by opened and flattened reeds, two weft preparing devices placed on either side of the loom and operating alternately, preparing discs placed in both weft preparing devices, driving means for said discs, separate passageways to guide the warp bands, roller pairs in said passageways to feed the warp bands, two supporting heddle frames to operate the warps, cross beams having an alternate motion to actuate the supporting heddle frames, a crank disc driving said cross beams, spring lathes having a horizontal rectilinear motion designed to push the wefts slowly and progressively in the warps, rotating arms to operate the lathes at suitable times, driving means for said arms, small rollers to feed the wefts and guide them in the warps, an endless chain to drive the small rollers, chains on both weft preparing devices to give an alternate movement to the endless chain, clutching devices to cause one or the other weft preparing devices to be actuated according to the direction in which the weft is to be introduced, and means to roll up the woven fabric.

7. A loom for weaving reeds comprising horizontal warps formed by flat bands constituted by previously opened and flattened reeds, horizontal wefts formed by flat bands constituted by opened and flattened reeds, two weft preparing devices placed on either side of the loom and operating alternately, preparing discs placed in both said devices, driving means for said discs, separate passage ways to guide the warp bands, roller pairs in said passage ways to feed said warp bands, two supporting heddle frames to operate the warps, driving means for same, spring lathes having a horizontal rectilinear motion designed to push the wefts slowly and progressively in the warps, driving means for said lathes, small rollers to feed the wefts and guide them in the warps, an endless driving chain for said small rollers, clutching devices to cause said chain to be actuated by one of the weft preparing devices according to the direction in which the weft is to be introduced, a beam to roll up the woven fabric, an arm provided with a pawl to operate said beam, a ratchet wheel engaging the pawl and a driving eccentric carried upon said arm.

In testimony that I claim the foregoing as my invention, I have signed my name.

PAUL de GUARDIA-CALMÈTES.